(12) United States Patent
Kaliyamoorthy et al.

(10) Patent No.: US 11,329,880 B2
(45) Date of Patent: May 10, 2022

(54) AUTOMATIC ROUTE REFLECTOR CONFIGURATION SYSTEM

(71) Applicant: Dell Products L.P., Round Rock, TX (US)

(72) Inventors: Karthi Kaliyamoorthy, Chengalpattu (IN); Muthulakshmi Radhakrishnan, Chennai (IN)

(73) Assignee: Dell Products L.P., Round Rock, TX (US)

(*) Notice: Subject to any disclaimer, the term of this patent is extended or adjusted under 35 U.S.C. 154(b) by 56 days.

(21) Appl. No.: 16/738,806

(22) Filed: Jan. 9, 2020

(65) Prior Publication Data

US 2021/0218663 A1 Jul. 15, 2021

(51) Int. Cl.
| | |
|---|---|
| H04L 12/24 | (2006.01) |
| H04L 41/08 | (2022.01) |
| H04L 45/00 | (2022.01) |
| H04L 45/42 | (2022.01) |
| H04L 41/0866 | (2022.01) |
| H04L 45/02 | (2022.01) |

(52) U.S. Cl.
CPC ...... *H04L 41/0886* (2013.01); *H04L 41/0866* (2013.01); *H04L 45/02* (2013.01); *H04L 45/04* (2013.01); *H04L 45/42* (2013.01)

(58) Field of Classification Search
CPC .................................................. H04L 41/0886
See application file for complete search history.

(56) References Cited

U.S. PATENT DOCUMENTS

| | | | | |
|---|---|---|---|---|
| 7,702,765 B1* | 4/2010 | Raszuk | ................... | H04L 45/02 709/223 |
| 2006/0245374 A1* | 11/2006 | Patel | ...................... | H04L 45/04 370/254 |
| 2009/0116393 A1* | 5/2009 | Hughes | ................... | H04L 45/20 370/238 |
| 2016/0248663 A1* | 8/2016 | Patel | ...................... | H04L 45/12 |
| 2020/0007429 A1* | 1/2020 | Murthy | ................... | H04L 45/44 |
| 2021/0176165 A1* | 6/2021 | Vairavakkalai | ......... | H04L 12/66 |

\* cited by examiner

*Primary Examiner* — Jason E Mattis
(74) *Attorney, Agent, or Firm* — Joseph Mencher

(57) ABSTRACT

An automatic route reflector configuration system includes a plurality of router devices that are coupled to each other in an autonomous system, with each of the router devices exchanging discovery communications, using information included in the discovery communications to generate a route reflector configuration database, and electing a closest one of the router devices as a route reflector based on the route reflector configuration database. Each router device elected as a route reflector then transmits automatic route reflector peering communications to each of the other router devices that include a role for that router device, receives an acceptance of the role for that router device from at least some of the router devices to which it transmitted automatic route reflector peering communications, and exchanges routes with each of the router devices that accepted the role for that router device.

20 Claims, 12 Drawing Sheets

| ROUTER ID | LOOPBACK IP ADDRESS | AFI/SAFI | IGP METRIC TO PEER | CLUSTER ID | ROLE | RR BGP ID | # OF ADJACENT iBGP PEERS | iBGP NEIGHBOR LIST |
|---|---|---|---|---|---|---|---|---|
| CE ROUTER DEVICE 204 | 10.216.248.33/32 | <1,1> | 0 | - | FULL-MESH | - | 1 | - |
| PE ROUTER DEVICE 206 | 10.216.248.1/32 | <1,1> | 10 | - | FULL-MESH | - | 2 | <CE 204, 10>, <PE 208, 10>, <PE 210, 20>, <PE 212, 30>, <CE 214, 40> |
| PE ROUTER DEVICE 208 | 10.216.248.3/32 | <1,1> | 20 | - | FULL-MESH | - | 2 | <CE 204, 20>, <PE 206, 10>, <PE 210, 10>, <PE 212, 20>, <CE 214, 30> |
| PE ROUTER DEVICE 210 | 10.216.248.4/32 | <1,1> | 30 | - | FULL-MESH | - | 2 | <CE 204, 30>, <PE 206, 20>, <PE 208, 10>, <PE 212, 10>, <CE 214, 20> |
| PE ROUTER DEVICE 212 | 10.216.248.2/32 | <1,1> | 40 | - | FULL-MESH | - | 2 | <CE 204, 40>, <PE 206, 30>, <PE 208, 20>, <PE 210, 10>, <CE 214, 10> |
| CE ROUTER DEVICE 214 | 10.216.248.34/32 | <1,1> | 50 | - | FULL-MESH | - | 1 | <CE 204, 50>, <PE 206, 40>, <PE 208, 30>, <PE 210, 20>, <PE 212, 10> |

| ROUTER ID | LOOPBACK IP ADDRESS | AFI/SAFI | IGP METRIC TO PEER | CLUSTER ID | ROLE | RR BGP ID | # OF ADJACENT iBGP PEERS | iBGP NEIGHBOR LIST |
|---|---|---|---|---|---|---|---|---|
| CE ROUTER DEVICE 204 | 10.216.248.33/32 | <1,1> | 0 | C1 | CLIENT | PE 206 | 1 | - |
| PE ROUTER DEVICE 206 | 10.216.248.1/32 | <1,1> | 10 | C1 | RR | PE 206 | 2 | <CE 204, 10>, <PE 208, 10>, <PE 210, 20>, <PE 212, 30>, <CE 214, 40> |
| PE ROUTER DEVICE 208 | 10.216.248.3/32 | <1,1> | 20 | C1 | CLIENT | PE 206 | 2 | <CE 204, 20>, <PE 206, 10>, <PE 210, 10>, <PE 212, 20>, <CE 214, 30> |
| PE ROUTER DEVICE 210 | 10.216.248.4/32 | <1,1> | 30 | C2 | CLIENT | PE 212 | 2 | <CE 204, 30>, <PE 206, 20>, <PE 208, 10>, <PE 212, 10>, <CE 214, 20> |
| PE ROUTER DEVICE 212 | 10.216.248.2/32 | <1,1> | 40 | C2 | RR | PE 212 | 2 | <CE 204, 40>, <PE 206, 30>, <PE 208, 20>, <PE 210, 10>, <CE 214, 10> |
| CE ROUTER DEVICE 214 | 10.216.248.34/32 | <1,1> | 50 | C2 | CLIENT | PE 212 | 1 | <CE 204, 50>, <PE 206, 40>, <PE 208, 30>, <PE 210, 20>, <PE 212, 10> |

FIG. 9

AUTOMATIC ROUTE REFLECTOR CONFIGURATION SYSTEM

BACKGROUND

The present disclosure relates generally to information handling systems, and more particularly to automatically configuring route reflectors for information handling systems utilizing the interior Border Gateway Protocol.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, router devices, sometimes operate as route reflectors to transmit data traffic. For example, the Border Gateway Protocol (BGP) is a standardized exterior gateway protocol that is designed to exchange routing and reachability information among autonomous systems provided on networks such as the Internet, while allowing router devices to make decisions based on paths, network policies, and/or rule sets configured by a network administrator. The BGP may also be utilized to make core routing decisions and/or for routing within an autonomous system (i.e., per the interior BGP (iBGP)). The iBGP provides for network routing components called route reflectors that offer an alternative to the logical full-mesh requirement of the iBGP, and act as a focal point for iBGP sessions by concentrating on the route reflector via the peering of multiple BGP peer devices (also called route reflector clients) to a central point provided by the route reflector (rather than peering with every other router device in the full mesh.)

As will be appreciated by one of skill in the art, the use of route reflectors may increase the scalability of iBGP for use with relatively large networks. For example, in a fully meshed iBGP network with 10 router devices, 90 individual Command Line Interface (CLI) statements (spread throughout all router devices in the topology) are required just to define the remote autonomous system for each iBGP device, and the use of route reflectors can cut those 90 CLI statements down to 18. However, conventional iBGP systems that employ route reflectors require the network administrator to manually configure those route reflectors, which is time consuming and prone to error, and any misconfigurations of the iBGP topology can result in routing loops that can be difficult to identify or trace.

Accordingly, it would be desirable to provide an automatic route reflector configuration system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a route reflector configuration engine that is configured to: exchange discovery communications with each of a plurality of router devices; generate, using information included in the discovery communications, a route reflector configuration database; operate, based on the route reflector configuration database, as a route reflector; transmit, while operating as the route reflector, automatic route reflector peering communications to each of the plurality of router devices, wherein each automatic route reflector peering communication transmitted to a router device includes a role for that router device; receive, while operating as the route reflector from at least some of the plurality of router devices to which the automatic route reflector peering communications were transmitted, an acceptance of the role for that router device; and exchange, while operating as the route reflector, routes with each of the plurality of router devices that accepted the role for that router device that was transmitted in the automatic route reflector peering communications.

BRIEF DESCRIPTION OF THE DRAWINGS

FIG. 7 is a schematic view illustrating an embodiment of a table that may be generated by router devices in the automatic route reflector configuration system of FIG. 2.

FIG. 9 is a schematic view illustrating an embodiment of a table that may be generated by router devices in the automatic route reflector configuration system of FIG. 2.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
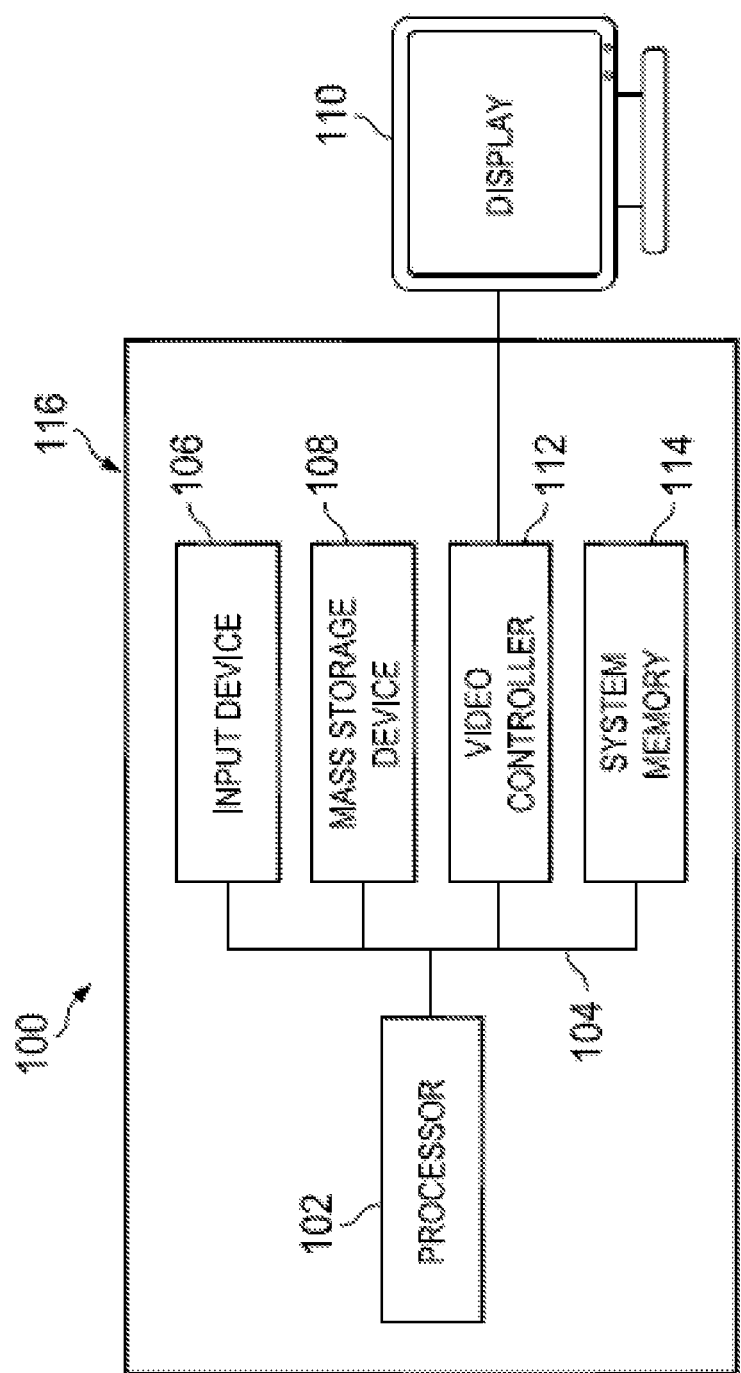
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
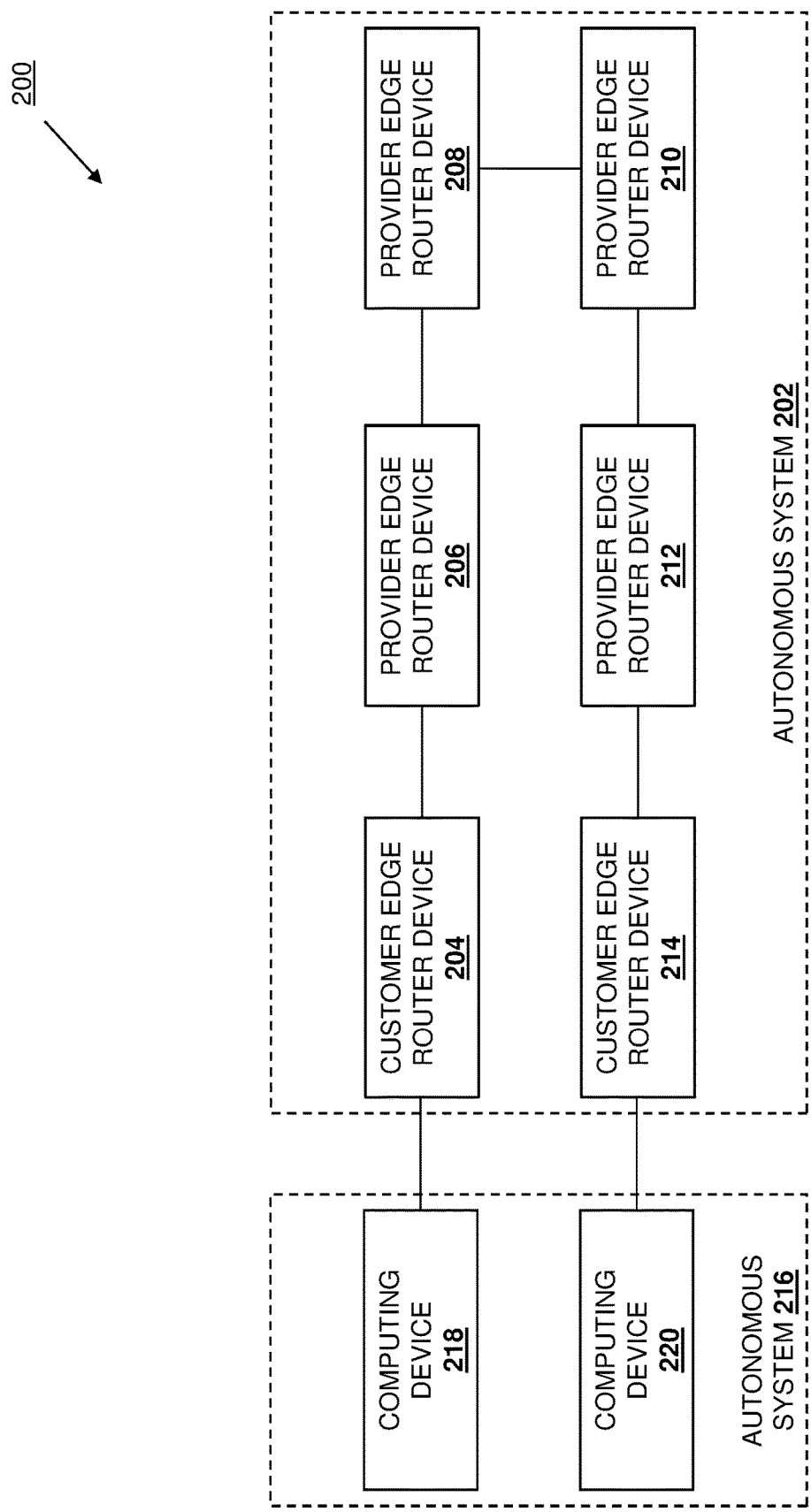
FIG. 2 is a schematic view illustrating an embodiment of an automatic route reflector configuration system.

Referring now to FIG. 2, an embodiment of an automatic route reflector configuration system 200 is illustrated. In the illustrated embodiment, the automatic route reflector configuration system 200 incudes an autonomous system 202 having a plurality of router devices such as the customer edge router device 204, the provider edge router device 206 physically connected (e.g., via cabling represented by a line in FIG. 2) to the customer edge router device 204, the provider edge router device 208 physically connected (e.g., via cabling represented by a line in FIG. 2) to the provider edge router device 206, the provider edge router device 210 physically connected (e.g., via cabling represented by a line in FIG. 2) to the provider edge router device 208, the provider edge router device 212 physically connected (e.g., via cabling represented by a line in FIG. 2) to the provider edge router device 210, and the customer edge router device 214 physically connected (e.g., via cabling represented by a line in FIG. 2) to the provider edge router device 214. In an embodiment, any or all of the router devices (e.g., the customer edge router devices 204 and 214, and the provider edge router devices 206, 208, 210, and 212) may be provided by the IHS 100 discussed above with reference to FIG. 1, and/or may include some or all of the components of the IHS 100. However, while illustrated and discussed as being provided by router devices, one of skill in the art in possession of the present disclosure will recognize that the router devices provided in the automatic route reflector configuration system 200 may include any networking devices and/or other computing devices that may be configured to operate similarly as the router devices discussed below.

In the illustrated embodiment, the automatic route reflector configuration system 200 also incudes an autonomous system 216 having a computing device 218 that is connected to the customer edge router device 204 in the autonomous system 202, and a computing device 220 that is connected to the customer edge router device 214 in the autonomous system 202. In an embodiment, either or both of the computing devices 218 and 220 may be provided by the IHS 100 discussed above with reference to FIG. 1, and/or may include some or all of the components of the IHS 100, and in specific examples may be provided by any devices that are configured to transmit data traffic with the autonomous system 202. While a few particular devices are illustrated and described below, one of skill in the art in possession of the present disclosure will recognize that many more router devices and/or other devices may (and typically will) be coupled to any of the devices (e.g., an a datacenter) while remaining within the scope of the present disclosure. Furthermore, while a specific automatic route reflector configuration system 200 has been illustrated and described, one of skill in the art in possession of the present disclosure will recognize that the automatic route reflector configuration system of the present disclosure may include a variety of components and component configurations while remaining within the scope of the present disclosure as well.

Figure 3:
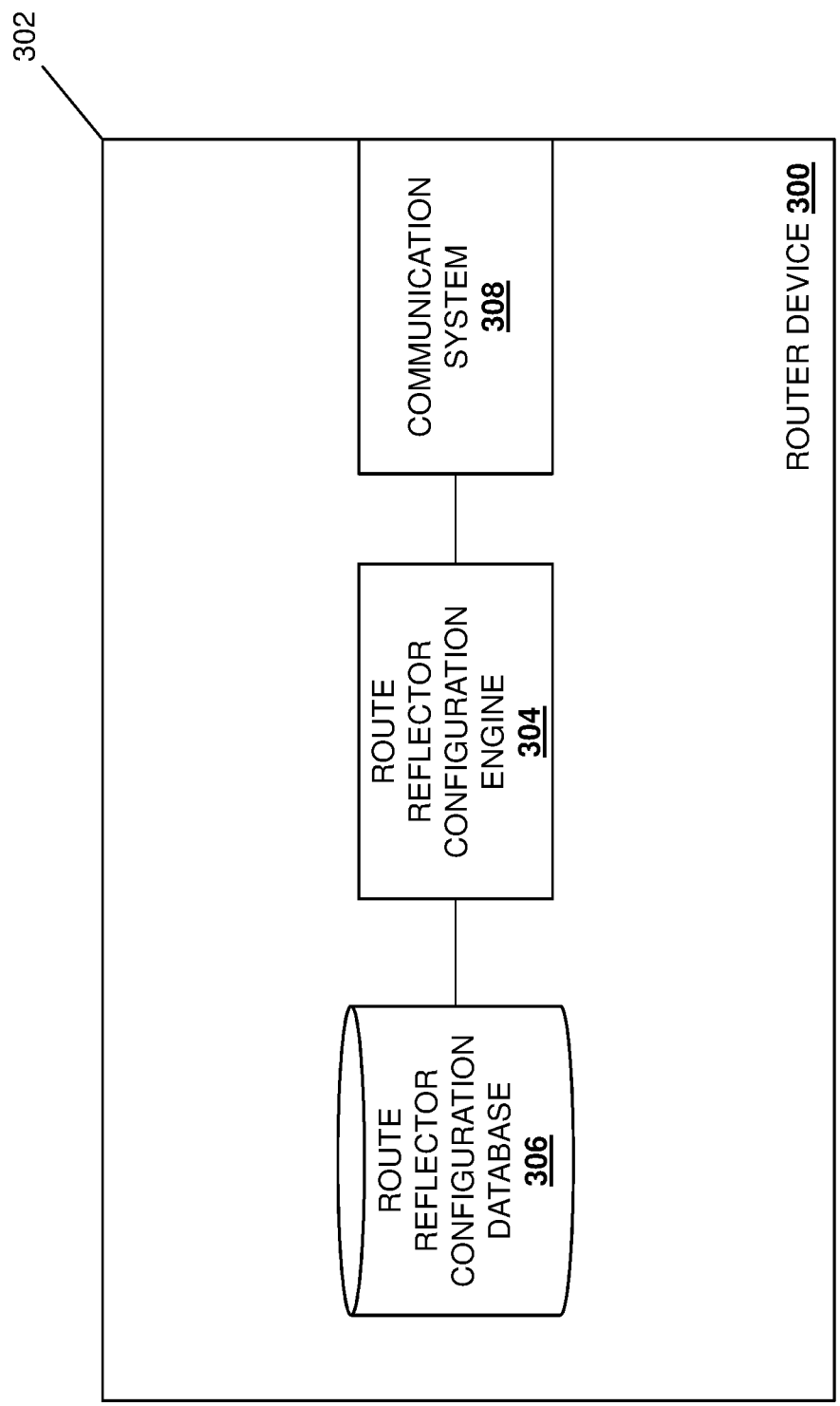
FIG. 3 is a schematic view illustrating an embodiment of a router device that may be provided in the automatic route reflector configuration system of FIG. 2.

Referring now to FIG. 3, an embodiment of a router device 300 is illustrated that may provide any or all of the router devices (e.g., the customer edge router devices 204 and 214, and the provider edge router devices 206, 208, 210, and 212) discussed above with reference to FIG. 2. As such, the router device 300 may be provided by the IHS 100 discussed above with reference to FIG. 1 and/or may include some or all of the components of the IHS 100. Furthermore, while illustrated and discussed as a router device, one of skill in the art in possession of the present disclosure will recognize that the functionality of the router device 300 discussed below may be provided by other networking devices and/or other devices that are configured to operate similarly as the router device 300 discussed below. In the illustrated embodiment, the router device 300 includes a chassis 302 that houses the components of the router device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a route reflector configuration engine 304 that is configured to perform the functionality of the route reflector configuration engines and/or router devices discussed below.

The chassis 302 may also house a storage system (not illustrated, but which may include the storage 108 discussed above with reference to FIG. 1) that is coupled to the route reflector configuration engine 304 (e.g., via a coupling between the storage system and the processing system) and that includes a route reflector configuration database 306 that is configured to store any of the information utilized by the route reflector configuration engine 304 discussed below. The chassis 302 may also house a communication system 308 that is coupled to the route reflector configuration engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific router device 300 has been illustrated, one of skill in the art in possession of the present disclosure will recognize that router devices (or other devices operating according to the teachings of the present disclosure in a manner similar to that described below for the router device 300) may include a variety of components and/or component configurations for providing conventional router device functionality, as well as the functionality discussed below, while remaining within the scope of the present disclosure as well.

Figure 4:
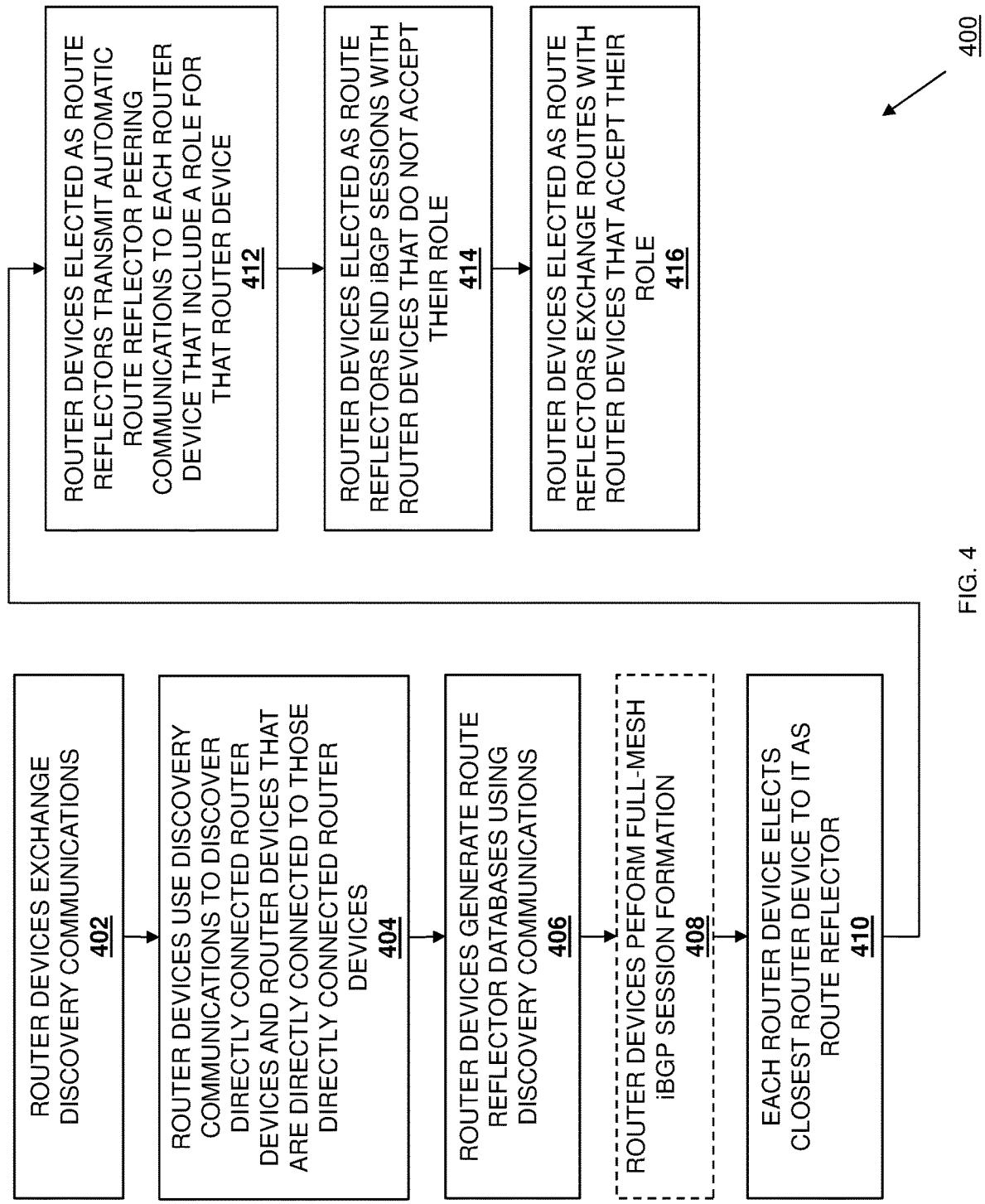
FIG. 4 is a flow chart illustrating an embodiment of a method for automatically configuring route reflectors.

Referring now to FIG. 4, an embodiment of a method 400 for automatically configuring route reflectors is illustrated. As discussed below, the systems and methods of the present disclosure provide for the automatic configuration of route reflectors in an autonomous system by having the router devices in that autonomous system exchange discovery communications with each other, use information included in the discovery communications to generate respective route reflector configuration databases, and each use their route reflector configuration databases to elect a closest one of the router devices as a route reflector. Each router device elected as a route reflector will then transmit automatic route reflector peering communications to each of the other router devices, with each automatic route reflector peering communication includes a role for the router device to which it was transmitted. Each router device elected as a route reflector will then receive a respective acceptance of its role from at least some of the router devices to which the automatic route reflector peering communications were transmitted, and operate to exchange routes with each of the router devices that accepted their roles. As will be appreciated by one of skill in the art in possession of the present disclosure, the systems and methods of the present disclosure provide for automatic route reflector configuration that prevents loops that can occur due to misconfiguration in conventional manual route reflector configuration systems.

Figure 5A:
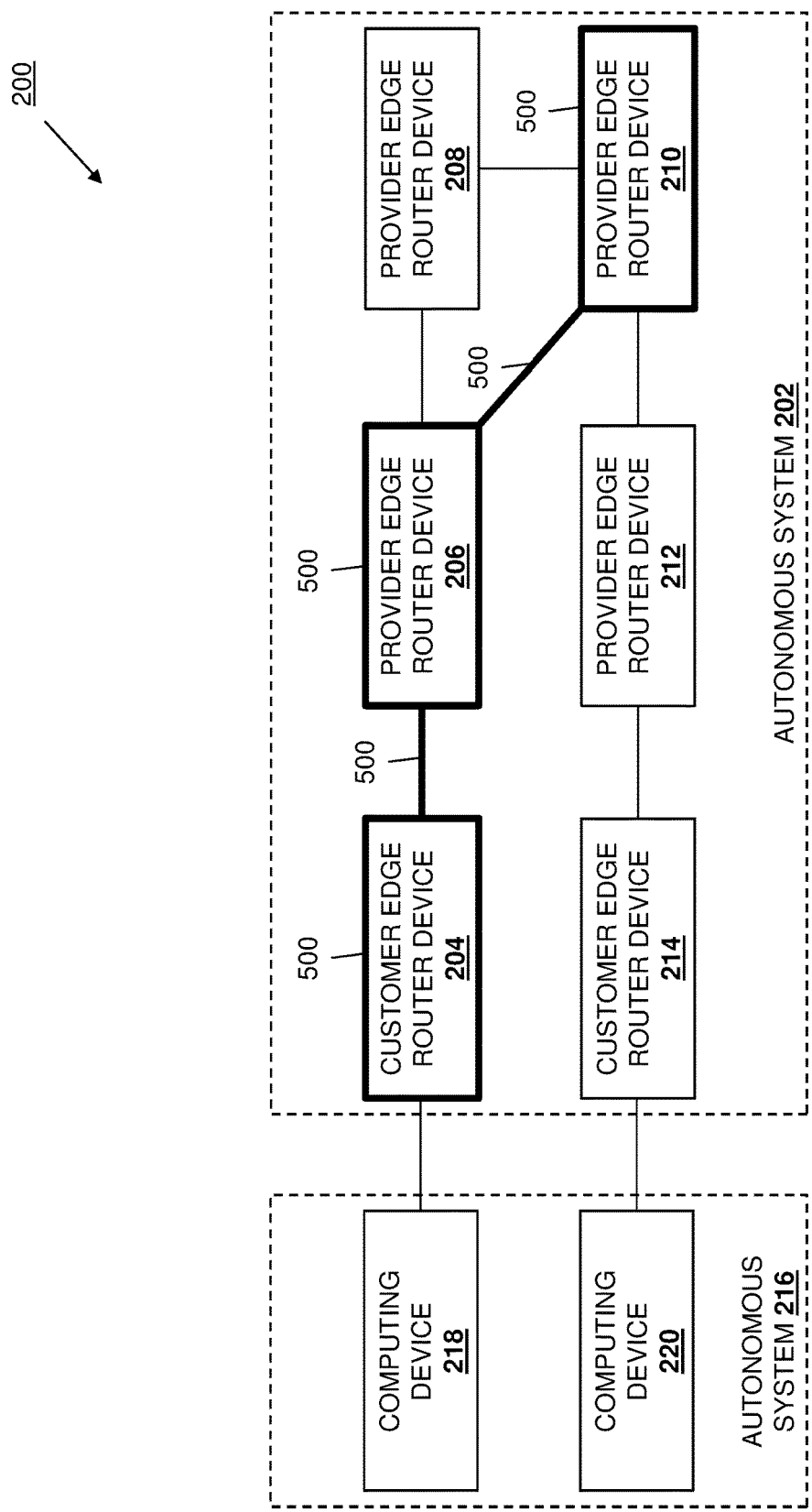
FIG. 5A is a schematic view illustrating an embodiment of a conventional route reflector configuration.
Figure 5B:
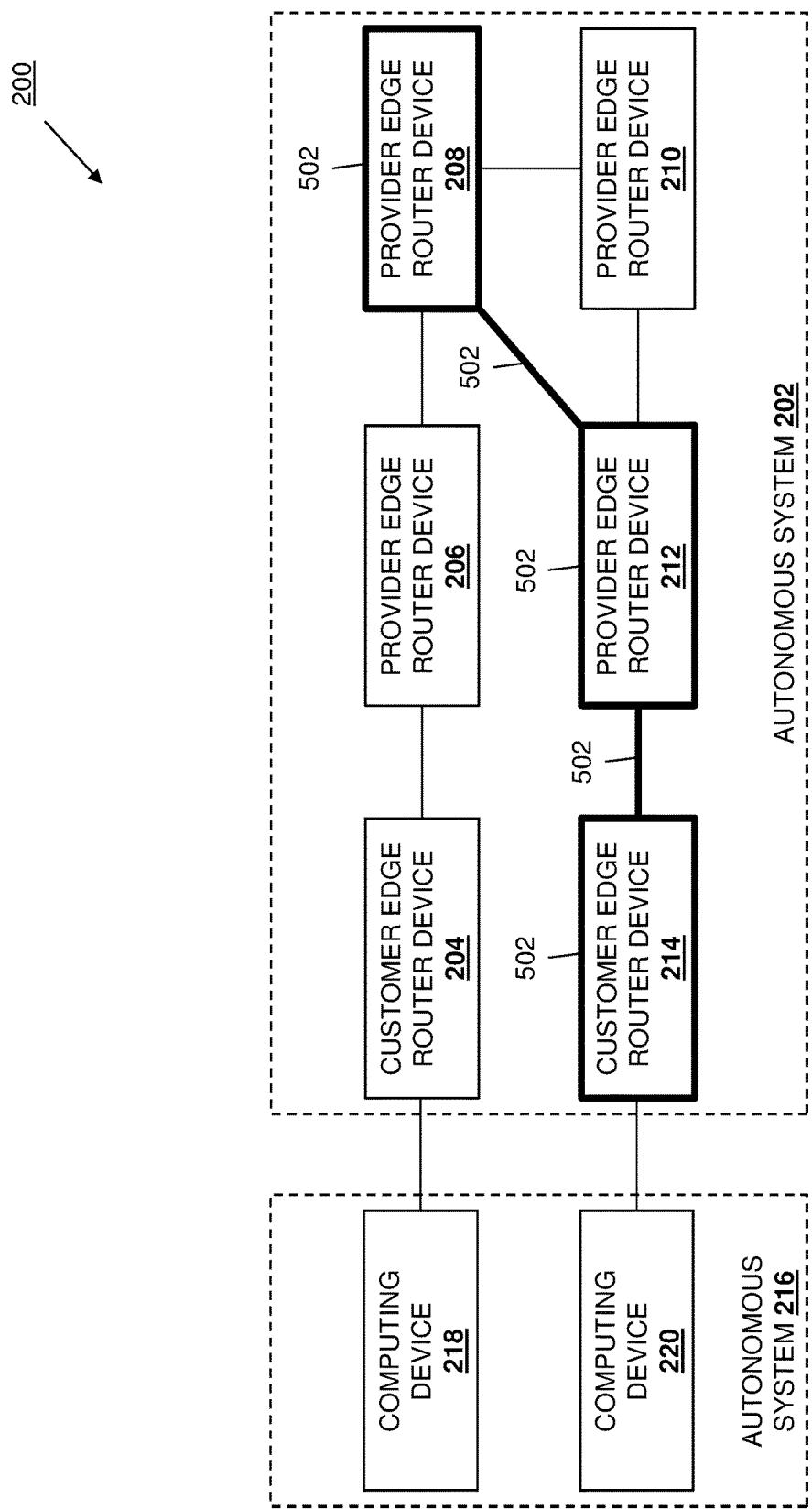
FIG. 5B is a schematic view illustrating an embodiment of a conventional route reflector configuration that may be provided with the conventional route reflector configuration of FIG. 5A.
Figure 5C:
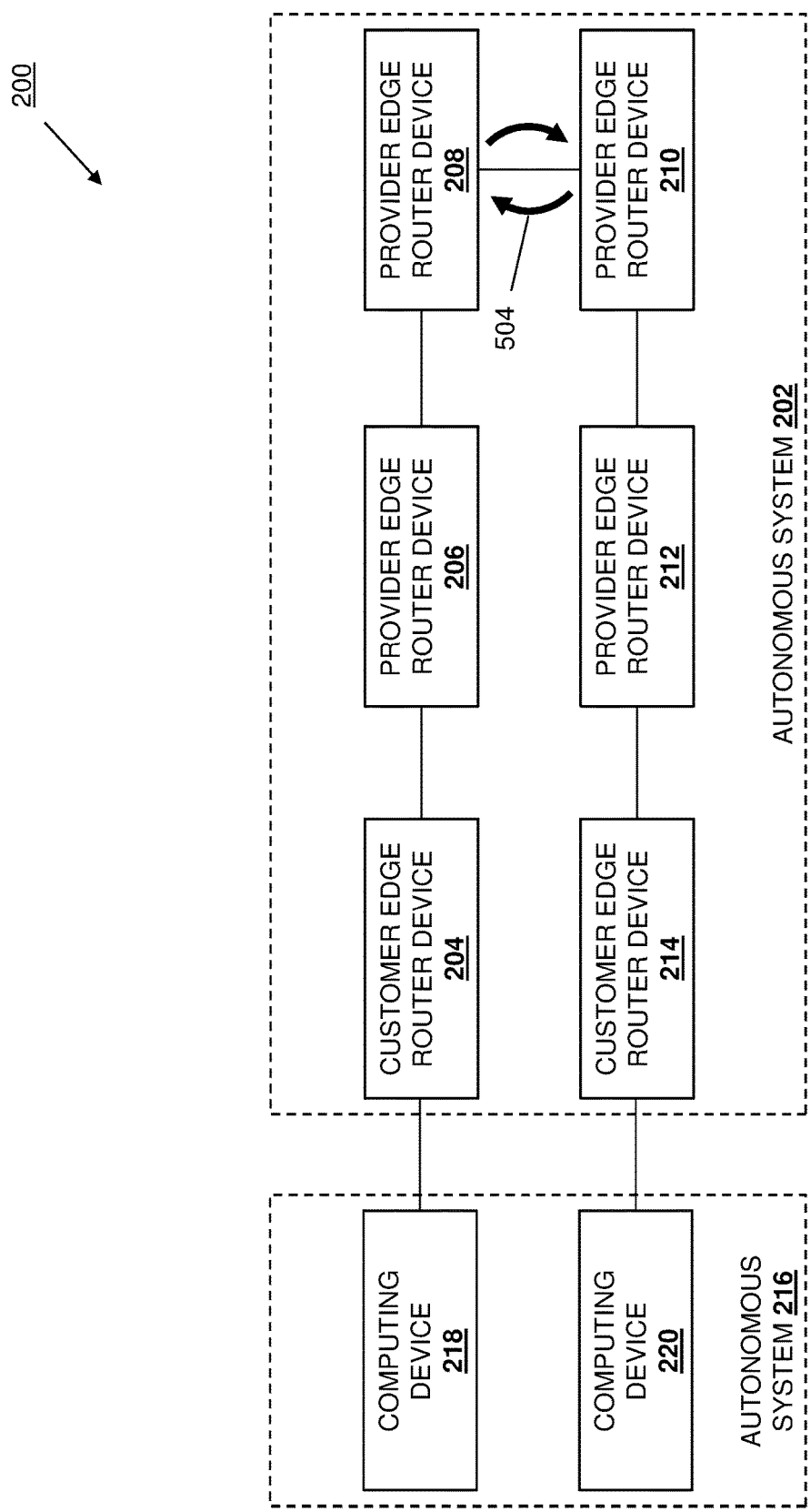
FIG. 5C is a schematic view illustrating an embodiment of a data traffic routing loop that may exist with the conventional route reflector configurations of FIGS. 5A and 5B.

With reference to FIGS. 5A, 5B, and 5C, an embodiment of a route reflector misconfiguration provided using conventional manual route reflector configuration techniques is illustrated to provide an example of just some of the benefits that may be realized via the systems and methods of the present disclosure. With reference to FIGS. 5A and 5B, a first route reflector session 500 (e.g., a logical iBGP route reflector session represented by the bolded customer edge router device 204, the provider edge router devices 206 and 210, and logical connections between them in FIG. 5A) may be manually configured by a network administrator with the provider edge router device 206 operating as a "first route reflector", and a second route reflector session 502 (e.g., a logical iBGP route reflector session represented by the bolded customer edge router device 214, the provider edge router devices 212 and 208, and logical connections between them in FIG. 5B) may be manually configured by the network administrator with the provider edge router device 212 operating as a "second route reflector". In the specific examples provided below, the router devices in the autonomous system 202 may be provided the loopback Internet Protocol (IP) addresses according to the following table:

| ROUTER DEVICE | LOOPBACK IP ADDRESS |
| --- | --- |
| CE ROUTER DEVICE 204 | 10.216.248.33/32 |
| PE ROUTER DEVICE 206 | 10.216.248.1/32 |
| PE ROUTER DEVICE 208 | 10.216.248.3/32 |
| PE ROUTER DEVICE 210 | 10.216.248.4/32 |
| PE ROUTER DEVICE 212 | 10.216.248.2/32 |
| CE ROUTER DEVICE 214 | 10.216.248.34/32 |

As such, one of skill in the art in possession of the present disclosure will recognize that the provider edge router device 210 is a route reflector client of the provider edge router device 206 operating as a "first route reflector" for the first route reflector session 500, and the provider edge router device 208 is a route reflector client of the provider edge router device 212 operating as a "second route reflector" for the second route reflector session 500. Furthermore, while not illustrated, one of skill in the art in possession of the present disclosure will recognize that an iBGP session may exists between the provider edge router device 206 operating as the "first route reflector" and the provider edge router device 212 operating as the "second route reflector".

Furthermore, FIG. 5C illustrates how the route reflector configurations discussed above with reference to FIGS. 5A and 5B may result in a data traffic routing loop. For example, each of the computing devices 218 and 220 in the autonomous system 216 may be reachable via an IP address "10.26.1.0/24". When the provider edge router device 208 receives data traffic and attempts to forward that data traffic to that IP address "10.26.1.0/24" (e.g., learned via the BGP), it will look up the IBGP address of the next hop to the customer edge router device 214 (which has a loopback IP address of "10.216.248.34/32") that is provided by the provider edge router device 210 (which has a loopback IP address of "10.216.248.4/32"), and it will forward the data traffic to the provider edge router device 210. When the provider edge router device 210 receives the data traffic and tries to forward it to the IP address "10.26.1.0/24" (e.g., learned via the BGP), it will look up the IBGP address of the next hop to the customer edge router device 204 (which has a loopback IP address of "10.216.248.33/32") that is provided by the provider edge router device 208 (which has a loopback IP address of "10.216.248.3/32"), and it will forward the data traffic to the provider edge router device 208. As such, the data traffic routing loop 504 illustrated in FIG. 5C will exist for the IP address "10.26.1.0/24". As discussed below, the automatic route reflector configuration provided by the systems and methods of the present disclosure prevents the route reflector session configurations illustrated in FIGS. 5A and 5B, and thus prevent loops like that illustrated in FIG. 5C.

In an embodiment, during or prior to the method 400, an iBGP session may be established in the autonomous system 202 using, for example, automatic iBGP full-mesh peering, configuration options provided to a network administrator, and/or other iBGP session establishing techniques that would be apparent to one of skill in the art in possession of the present disclosure. The establishment of an iBGP session is known in the art, and thus not described herein in detail. However, as will be appreciated by one of skill in the art in possession of the present disclosure, in the case of iBGP session establishment via automatic iBGP full-mesh peering, BGP communications including iBGP peering Type-Length-Value (TLV) structures may be flooded via the iBGP in order to allow each of the router devices in the autonomous system 202 to discover their adjacent neighbors.

Figure 6:
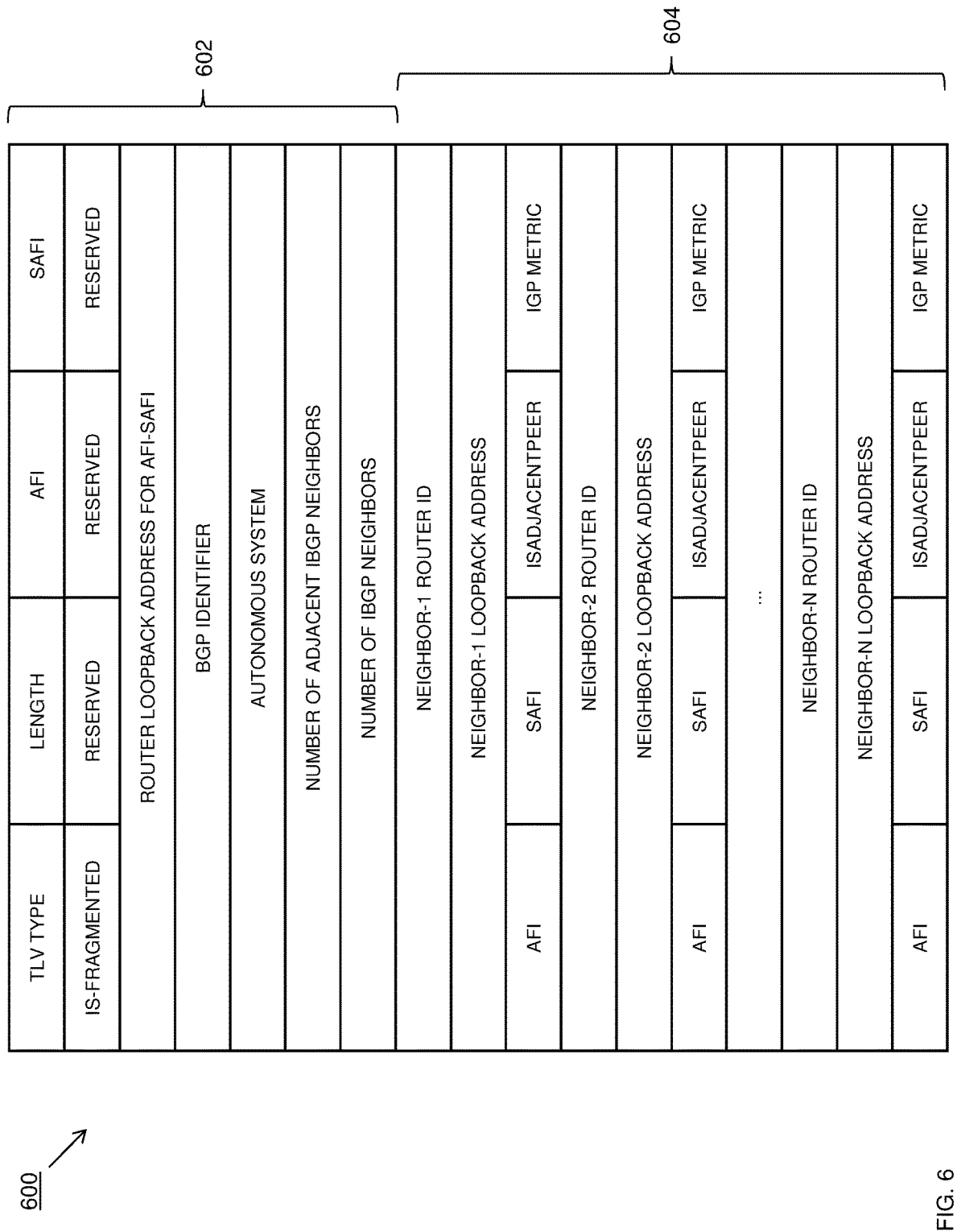
FIG. 6 is a schematic view illustrating an embodiment of a communication that may be transmitted by router devices in the automatic route reflector configuration system of FIG. 2.

The method 400 begins at block 402 where router devices exchange discovery communications. In an embodiment, at block 402, the route reflector configuration engine 304 in each of the router devices 300 in the autonomous system 202 may continue operations to discover iBGP peer devices via the exchange of discovery communications. For example, at block 402, the route reflector configuration engine 304 in each of the router devices 300 in the autonomous system 202 may exchange (via their communication systems 308) Border Gateway Protocol (BGP) communications including "Router Discovery & Neighbor information" Type-Length-Value (TLV) structures provided according to the teachings of the present disclosure. FIG. 6 illustrates a specific example of an BGP communication 600 with "Router Discovery & Neighbor information" TLV structures, and includes router discovery information 602, and neighbor discovery information 604.

In the illustrated example, the router discovery information 602 for any router device generating and transmitting the BGP communication 600 may identify a "Router Discovery & Neighbor information" TLV type of the BGP communication 600, a length of the BGP communication 600, an Address Family Identifier (AFI) for that router device, a Subsequent Address Family Identifier (SAFI) for that router device, a fragmentation indication for that BGP communication 600, a router loopback address for the AFI-SAFI for that router device, a BGP identifier for that router device, an autonomous system to which that router device belongs, a number of adjacent iBGP neighbors to that router device, and a number of iBGP neighbors to that router device. Furthermore, the neighbor information 604 for any router device generating and transmitting the BGP communication 600 may identify, for each neighbor router device of that router device (e.g., neighbor router devices 1, 2, and up to N in the illustrated embodiment), a router identifier for that neighbor router device, and a loopback IP address for that neighbor router device, an AFI for that neighbor router device, an SAFI for that neighbor router device, an adjacent peer indicator for that neighbor router device, and an interior Gateway Protocol (iGP) cost metric for that neighbor router device. However, while specific discovery communications have been illustrated and described, one of skill in the art in possession of the present disclosure will appreciate that discovery communications may exchange discovery information in a variety of manners that allow the iBGP peer discovery discussed herein while remaining within the scope of the present disclosure.

The method 400 then proceeds to block 404 where router devices use the discovery communications to discover directly connected router devices and router devices that are directly connected to those directly connected router devices. In one example of block 402, the route reflector configuration engine 304 in each of the router devices 300 in the autonomous system 202 may generate and periodically flood the BGP communications with "Router Discovery & Neighbor information" TLV structures to all iBGP router devices in the iBGP domain via iGP in order to allow iBGP peer devices to discover any other iBGP peer device and its adjacent/directly connected neighbor devices. As such, at block 404, the route reflector configuration engine 304 in each of the router devices 300 in the autonomous system 202 may receive the BGP communications via their communications system 308 at block 402, and use the router discovery information 602 and/or neighbor discovery information 604 therein to identify other router devices that are directly connected to it (e.g., "directly connected router devices), and other router devices that are directly connected to those directly connected router devices.

The method 400 then proceeds to block 406 where the router devices generate route reflector configuration tables in their route reflector configuration databases using the discovery communications. In an embodiment, at block 406, the route reflector configuration engine 304 in each of the router devices 300 in the autonomous system 202 may receive the BGP communications via their communications system 308 at block 402, and use the router discovery information 602 and/or neighbor discovery information 604 therein to generate a route reflector configuration table in their route reflector configuration databases 306. FIG. 7 illustrates an example of a route reflector configuration table 700 that may be generated by the route reflector configuration engine 304 in the customer edge router device 204 at block 406 based on the discovery communications received from the other router devices in the autonomous system 202.

As can been seen in FIG. 7, the route reflector configuration table 700 includes a router identifier column, a loopback IP address column, an AFI/SAFI column, an IGP metric to peer column, a cluster identifier column, a role column, a route reflector BGP identifier column, a number of adjacent iBGP peers column, and an iBGP neighbor list column. Furthermore, an entry may be provided along each row of the route reflector configuration table 700 for each router device in the autonomous system 202, with the route reflector configuration table 700 in the illustrated embodiment having been generated by the customer edge router device 204 and including a first entry for itself, a second entry for the provider edge router device 206, a third entry for the provider edge router device 208, a fourth entry for the provider edge router device 210, a fifth entry for the provider edge router device 212, and a sixth entry for the customer edge router device 214. As will be appreciated by one of skill in the art in possession of the present disclosure, the route reflector configuration table 700 illustrated in FIG. 7 is incomplete, as the route reflector configuration table 700 includes columns for each router device that are populated once route reflector configuration is completed, discussed in further detail below. One of skill in the art in possession of the present disclosure will appreciate how similar route reflector configuration tables may be generated by the other router devices in a similar manner while remaining within the scope of the present disclosure.

The method 400 then proceeds to optional block 408 where the router devices may perform full-mesh iBGP session formation. In an embodiment, in situations where a full-mesh iBGP session has not yet been formed between the iBGP peers in the autonomous system 202, optional block 408 may be performed by the route reflector configuration engine 304 in each of the router devices 300 in the autonomous system 202 to automatically form a full-mesh iBGP session, but without the exchange of route updates. Automatic full-mesh iBGP session formation may be performed using a variety of conventional operations, and thus is not discussed in detail herein. However, one of skill in the art in possession of the present disclosure will appreciate that the automatic full-mesh iBGP session formation performed at optional block 408 differs slightly from conventional automatic full-mesh iBGP session formation due to the lack of exchange of route updates.

The method 400 then proceeds to block 410 where each router device elects a router device that is closest to it as a route reflector. Following the generation of the route reflector configuration tables (and, in embodiments in which the full-mesh iBGP session has not yet been formed, the formation of a full-mesh iBGP session), the router devices in the autonomous system 202 may operate to automatically elect route reflectors in a loop-free manner, and configure those route reflectors. As such, in an embodiment of block 410, the route reflector configuration engine 304 in each of the router devices 300 in the autonomous system 202 may utilize the information in its route reflector database 306 to automatically elect a router device that is closest to it as a route reflector. In an embodiment, the automatic route reflector election may rely on the underlying IGP in order to determine an IGP cost metric to an IGP peer device in order to determine a closest router device to elect as a route reflector, and one of skill in the art in possession of the present disclosure will appreciate that the IGP cost metric provides a mechanism to adhere to the physical topology (e.g., the physical connections of the router devices) of the autonomous system 202 in selecting appropriate router devices to operate as route reflectors.

Furthermore, in some specific examples, more than one router device may be an equal, closest distance to the router device that is making the route reflector election, and in the event of such a "tie", the router device making the route reflector election may select one or more of those router device(s) with the highest number of adjacent iBGP peer devices. Further still, when more than one router devices that are equally close to the router device making the route reflector election also have an equal number of adjacent iBGP peer devices, the router device making the route reflector election may elect, from those router devices, the router device with the "lowest" BGP identifier as the route reflector.

As such, with reference to the automatic route reflector configuration system 200 of FIG. 2, at block 410 the provider edge router devices 206 and 212 may be elected as route reflectors. For example, with reference to the route reflector configuration table 700 of FIG. 7, a route reflector candidate list may be identified based on the total number of directly adjacent iBGP peer devices for each router device identified that route reflector configuration table 700 (e.g., with the provider edge router devices 206, 208, 210, and 212 each on that route reflector candidate list due to each having 2 adjacent iBGP peers), with the provider edge router devices 206 and 212 elected as route reflectors based on those route devices being closest to the highest number of iBGP neighbor devices. For example, each of the router devices in the autonomous system 202 may particular in "first" route reflector operations that result in the provider edge router devices 206, 208, 210, and 212 on the route reflector candidate list due to each having 2 adjacent iBGP peers. Subsequently, the provider edge router devices 206 and 212 may be elected as the route reflectors over the provider edge router devices 208 and 210 due to those provider edge router devices having the lowest BGP identifier (e.g., the "lowest" IP address.) As will be appreciated by one of skill in the art in possession of the present disclosure, once of a router device is elected as a route reflector, the election mechanism may not be preempted unless that router device becomes unavailable, or non-client relationship(s) are trigged (by a client) via manual intervention by a network administrator.

The method 400 then proceeds to block 412 where router devices elected as route reflectors transmit automatic route reflector peering communications to each router device that include a role for that router device. In an embodiment, at block 412, the route reflector configuration engine 304 in each of the router devices 206 and 212 that were elected as route reflectors may operate to generate and flood automatic route reflector peering communications to each router device in the autonomous system 202 (e.g., in the iBGP domain using existing iBGP peering sessions via BGP hello messages), with each of those automatic route reflector peering communications including a role (e.g., a client role, a non-client role, a non-peer role) that the router device elected as the route reflector determined for the router device to which the automatic route reflector peering communications are being transmitted. For example, the route reflector configuration engine 304 in the router device 206 elected as a route reflector may identify client roles for each of the customer edge router device 204 and the provider edge router device 208, a non-client role for the provider edge router device 210, and a non-peer role for each of the provider edge router device 212 and the customer edge router device 214. Similarly, the route reflector configuration engine 304 in the router device 212 elected as a route reflector may identify client roles for each of the customer edge router device 24 and the provider edge router device 210, a non-client role for the provider edge router device 208, and a non-peer role for each of the provider edge router device 206 and the customer edge router device 204.

As will be appreciated by one of skill in the art in possession of the present disclosure, a client role may be s assigned to an iBGP router device based on that router device belonging to same cluster as the router device making the assignment, and based on that router device being nearest to the router device making the assignment. Furthermore, a non-client/non-peer role may be assigned to an iBGP router device when the number of iBGP clients for the router device making the assignment exceeds a threshold, and another iBGP router device has selected as a route reflector for another cluster. As such, the roles assigned by the router device operating as the route reflectors may include a client role for iBGP router devices that peer with the router device operating as the route reflector in a cluster and form the clients for that route reflector, a non-client role for another router device operating as another route reflector but belonging to a different cluster (i.e., having a different cluster identifier), and a non-peer role for iBGP router devices that peer with another router device operating as a route reflector in a different cluster and that do not have a direct iBGP session with router devices outside their cluster.

As will be appreciated by one of skill in the art in possession of the present disclosure, the automatic route reflector peering communications of the present disclosure (which may be propagated by BGP hello messages) may operate to generate a state/role change in the iBGP peering, and may be transmitted unsolicited or as triggered messages in response to BGP communications with TLV structures that are received from the other router devices in the BGP hello message exchange. Furthermore, subsequent automatic route reflector peering communications may be sent at periodic hello message intervals from the router device elected as the route reflector to all clients and non-clients, as well as from clients to the route reflector.

Figure 8:
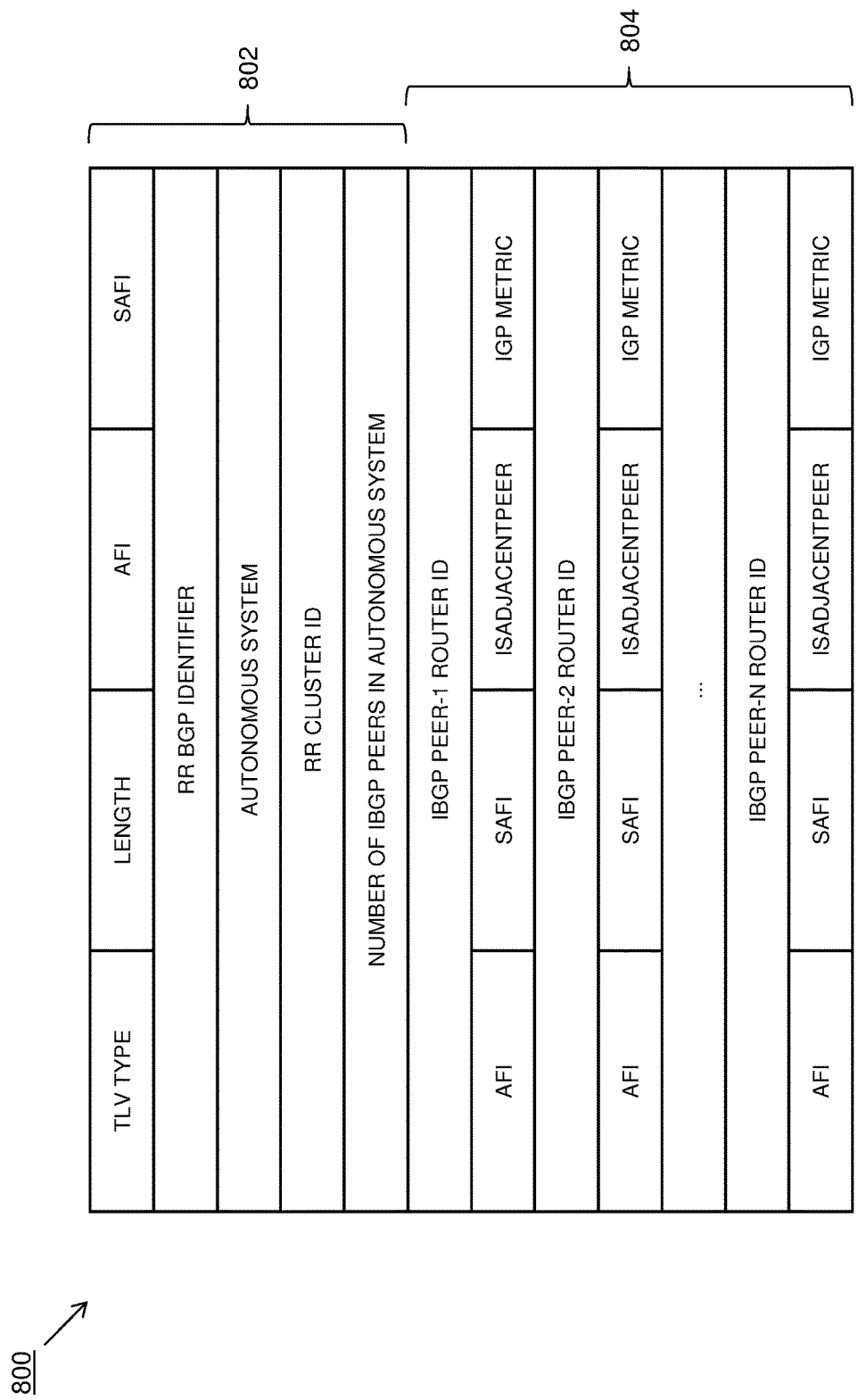
FIG. 8 is a schematic view illustrating an embodiment of a communication that may be transmitted by router devices in the automatic route reflector configuration system of FIG. 2.

For example, at block 412, the route reflector configuration engine 304 in each of the router devices 206 and 212 that were elected as route reflectors may generate and transmit (via their communication systems 308) Border Gateway Protocol (BGP) communications including "Automatic Route Reflector Peering Information" Type-Length-Value (TLV) structures provided according to the teachings of the present disclosure. FIG. 8 illustrates a specific example of a BGP communication 800 with "Automatic Route Reflector Peering Information" TLV structures, and includes route reflector information 802, and route reflector peering information 804.

In the illustrated example, the route reflector information 802 for any router device that was elected as a route reflector and that is generating and transmitting the BGP communication 800 may identify an "Automatic Route Reflector Peering Information" TLV type of the BGP communication 800, a length of the BGP communication 800, an Address Family Identifier (AFI) for that router device, a Subsequent Address Family Identifier (SAFI) for that router device, a route reflector BGP identifier for that router device, an autonomous system to which that router device belongs, route reflector cluster identifier for the route reflector session provided by that router device, and a number of iBGP peers for that router device in its autonomous system. Furthermore, the route reflector peering information 804 for any router device that was elected as a route reflector and that is generating and transmitting the BGP communication 800 may identify, for each iBGP peer router device for that router device (e.g., iBGP peer router devices 1, 2, and up to N in the illustrated embodiment), iBGP peer route identifier for that iBGP peer router device, an AFI for that iBGP peer router device, an SAFI for that iBGP peer router device, an adjacent peer indicator for that iBGP peer router device, and an interior Gateway Protocol (iGP) metric for that iBGP peer router device. In a specific example, roles being assigned to iBGP router devices may be stored in iBGP peering information databases, and communication of those roles may be performed via the automatic route reflector peering information TLV structures in the BGP communications. However, while specific automatic route reflector peering communications have been illustrated and described, one of skill in the art in possession of the present disclosure will appreciate that automatic route reflector peering communications may exchange automatic route reflector peering information in a variety of manners that allow the automatic route reflector configuration discussed herein while remaining within the scope of the present disclosure.

In a specific example, the route reflector cluster identifier for the route reflector session provided by the router device that was elected as a route reflector may be generated by performing hashing operations on the BGP router device identifier for that router device, and when a router device is newly elected as a route reflector, that router device may generate the route reflector cluster identifier and determine whether that route reflector cluster identifier is unique in the autonomous system to which it belongs (e.g., a route reflector cluster identifier generated by the provider edge router device 206 would be checked to determine whether it is unique in the autonomous system 202.)

The method 400 then proceeds to block 414 where router devices elected as route reflectors end iBGP sessions with router devices that do not accept their role. In an embodiment, at block 414, the route reflector configuration engine 304 in each of the router devices 206 and 212 that were elected as route reflectors may identify router devices in the autonomous system 202 that do not accept the client roles proposed to them in the automatic route reflector peering communications. As will be appreciated by one of skill in the art in possession of the present disclosure, a router device may not accept a client role proposed for them by a router device elected as a route reflector due to a conflict in the election (e.g., when two potential route reflectors are equal distances from other router devices and have the same number of direct iBGP peer devices from the perspective of those router devices, and must select one of those as their route reflector), and the route reflector configuration engine 304 in the router device 206 and/or 212 identifying non-acceptance of a proposed role may select a non-client role or non-peer role for that router device, and may then transmit that new role to that router device in another automatic route reflector peering communication. In the event that router device does not accept the non-client role or non-peer role proposed for them by the router device elected as the route reflector such that that router device has no peering relationship with the router device operating as a route reflector, the route reflector configuration engine 304 in that router device operating as the route reflector may end the iBGP session that that router device. However, the route reflector configuration engine 304 in the router device operating as a route reflector may maintain full-mesh iBGP peering with all router devices operating in a non-client role.

The method 400 then proceeds to block 416 where router devices elected as route reflectors exchange routes with router devices that accept their role. In an embodiment, at block 416, the route reflector configuration engine 304 in each of the router devices 206 and 212 that were elected as route reflectors may identify router devices in the autonomous system 202 that accept the client roles proposed to them in the automatic route reflector peering communications, and may then exchange routes with those router devices. The exchange of routes between a router device elected as a route reflector and router devices operating as clients for that route reflector may be performed using conventional BGP mechanisms (e.g., as defined in the Request For Comments (RFC) 4456), and thus is not described herein in detail.

FIG. 9 illustrates an example of an updated route reflector configuration table 900 that may be generated by the route reflector configuration engine 304 in the customer edge router device 204 following the route reflector elections and role assignments discussed above. As can been seen in FIG. 9, the updated route reflector configuration table 900 includes updates in the cluster identifier column, the role column, and the route reflector BGP identifier column for each entry that was provided in the route reflector configuration table 700 of FIG. 7. As such, entries provided along each row of the route reflector configuration table 700 for each router device in the autonomous system 202 may be updated, with the updated route reflector configuration table 900 in the illustrated embodiment having been generated by the customer edge router device 204 and providing a cluster identifier "C1" for the customer edge router device 204 and provider edge router devices 206 and 208 that are part of the same route reflector session, and cluster identifier "C2" for the customer edge router device 214 and provider edge router devices 212 and 210 that are part of the same route reflector session. Furthermore, the updated route reflector configuration table 900 in the illustrated embodiment also identifies the route reflector role for the provider edge router device 206 and the client roles for the customer edge router device 204 and provider edge router device 208 in the route reflector session with the provider edge router device 206, and the route reflector role for the provider edge router device 212 and the client roles for the customer edge router device 214 and provider edge router device 210 in the route reflector session with the provider edge router device 212.

Figure 10:
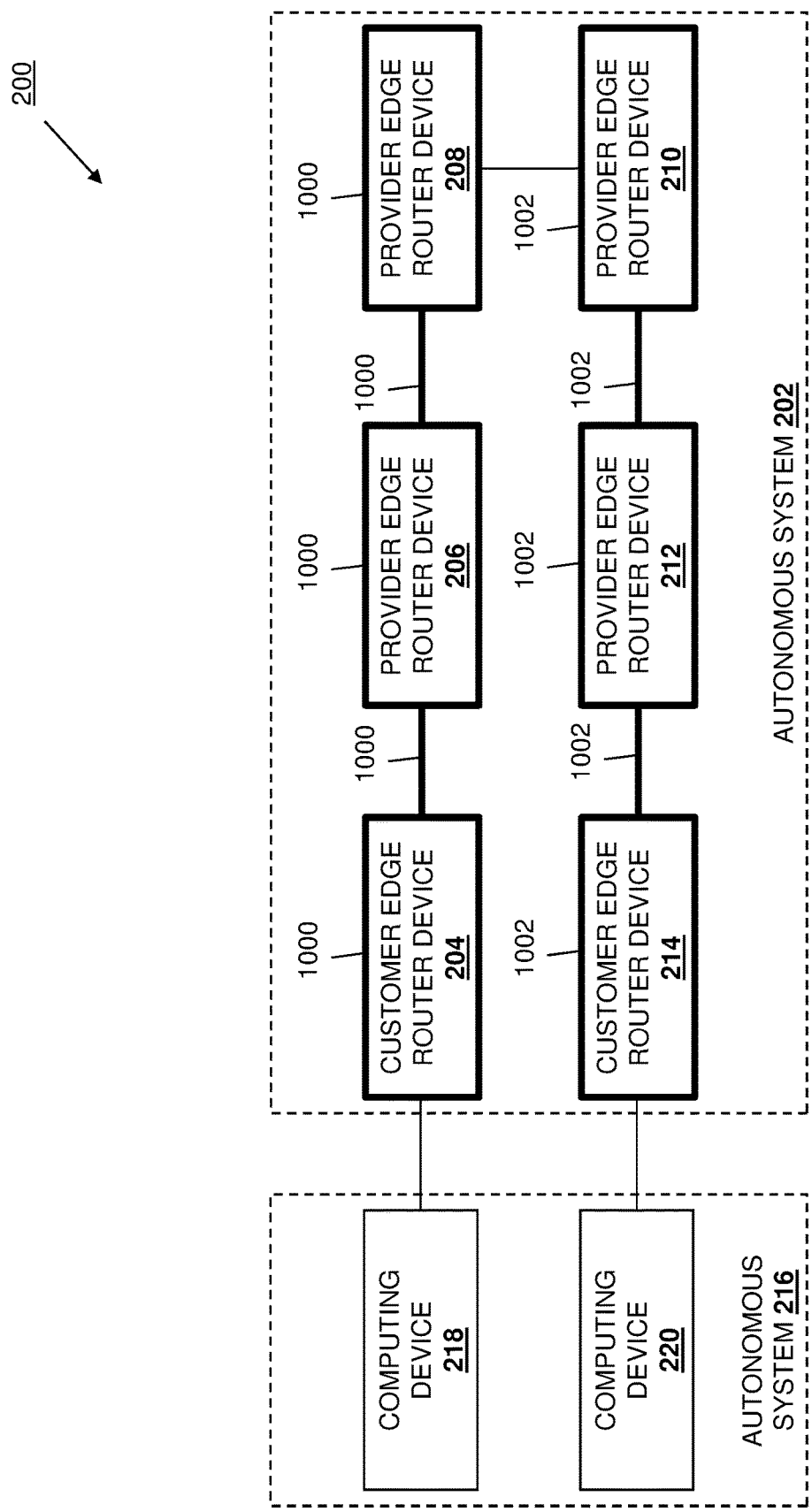
FIG. 10 is a schematic view illustrating an embodiment of route reflector configurations that may be provided in the automatic route reflector configuration system of FIG. 2 during the method of FIG. 4.

As such, with reference to FIG. 10, a first route reflector session 1000 (e.g., a logical iBGP route reflector session represented by the bolded customer edge router device 204, the provider edge router devices 206 and 208, and logical connections between them in FIG. 10) may be automatically configured with the provider edge router device 206 operating as a "first route reflector", and a second route reflector session 1002 (e.g., a logical iBGP route reflector session represented by the bolded customer edge router device 214, the provider edge router devices 212 and 210, and logical connections between them in FIG. 5B) may be automatically configured with the provider edge router device 212 operating as a "second route reflector". As will be appreciated by one of skill in the art in possession of the present disclosure, no iBGP session exists between the provider edge router devices 208 and 210, so no routing loop can be formed between the provider edge router devices 208 and 210. Furthermore, only four iBGP session need be formed in the autonomous system 202 (e.g., between the customer edge router device 204 and the provider edge router device 206, between the provider edge router devices 206 and 208, between the customer edge router device 214 and the provider edge router device 212, and between the provider edge router devices 212 and 210), as opposed to conventional IBGP full-mesh datacenter topologies that provide iBGP sessions between each pair of router devices.

In some embodiments, any router devices operating as a route reflector may be capable of supporting a maximum number of clients, and in the event the number of clients for that router device/route reflector exceeds the maximum number of clients, that router device may identify the maximum number of clients that are closest to it (e.g., based on the IGP cost metric discussed above), and define the remaining clients as non-clients. In the event there are more than two non-clients, the non-clients may then operate to re-elect a route reflector from amongst themselves, with the router device operating as the newly elected route reflector flooding the identification of the clients/non-clients/non-peers via the iBGP sessions, and forming a non-client relationship with the router device it previously elected as a route reflector. That router device that was previously elected as the route reflector may receive the identification of the clients/non-clients/non-peers, update its route reflector configuration database, and flood the updated information to all clients and non-clients via the BGP communications with the Automatic Route Reflector Peering Information TLV structures in the BGP hello messages discussed above.

In some situations, a new router device/iBGP peer device may be added to the autonomous system 202 that has already had its route reflectors elected and configured as discussed above. In such a situation, that new router device will flood its peering information to the other router devices via the IGP, and will also receive the BGP communications with the Router Discovery & Neighbor Information TLV structures discussed above (i.e., from the router devices operating as route reflectors, route reflector clients, a route-reflector non-clients present in the iBGP domain via the iGP.) As such, the new router device may build its route reflector configuration database as discussed above, and determine its nearest route reflectors from the existing route reflectors based on the iGP cost metric for the elected route reflectors. A new iBGP session is then initiated between the selected router device operating as the route reflector and the new router device, and the router device operating as the route reflector sends the BGP communications including the Automatic Route Reflector Peering Information TLV structures in the BGP hello messages proposing a role for the new router device. The new router device responds to the role proposed for it, and when the role and states converge for the router device operating as the route reflector and the new router device, they may exchange the route update as discussed above.

Thus, systems and methods have been described that provide for the automatic configuration of route reflectors in an autonomous system by having the router devices in that autonomous system exchange discovery communications with each other, use information included in the discovery communications to generate respective route reflector configuration databases, and each use their route reflector configuration databases to elect a closest one of the router devices as a route reflector. Each router device elected as a route reflector will then transmit automatic route reflector peering communications to each of the other router devices, with each automatic route reflector peering communication includes a role for the router device to which it was transmitted. Each router device elected as a route reflector will then receive a respective acceptance of its role from at least some of the router devices to which the automatic route reflector peering communications were transmitted, and operate to exchange routes with each of the router devices that accepted their roles. As will be appreciated by one of skill in the art in possession of the present disclosure, the systems and methods of the present disclosure that reduce the need for manual configurations, and provide for automatic route reflector configuration that prevents loops that can occur due to misconfiguration in conventional manual route reflector configuration systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automatic route reflector configuration system, comprising:
   a plurality of router devices that are coupled to each other in an autonomous system, wherein each of the plurality of router devices is configured to:
      exchange discovery communications with each of the other router devices;
      generate, using information included in the discovery communications, a route reflector configuration database; and
      elect, as a route reflector using its route reflector configuration database, a closest one of the plurality of router devices that is not currently elected as a route reflector; and
   wherein each router device elected as a route reflector is configured to:

transmit automatic route reflector peering communications to each of the other router devices, wherein each automatic route reflector peering communication transmitted to a router device includes a role for that router device;
receive, from at least some of the router devices to which the automatic route reflector peering communications were transmitted, an acceptance of the role for that router device; and
exchange routes with each of the plurality of router devices that accepted the role for that router device that was transmitted in the automatic route reflector peering communications.

2. The system of claim 1, wherein each of the plurality of router devices is configured to:
discover, using the discovery communications received from each of the other router devices, one or more router devices to which it is directly connected, and one or more router devices that are directly connected to each router device to which it is directly connected.

3. The system of claim 1, wherein each of the plurality of router devices is configured, following the generation of its route reflector configuration database, to:
perform full mesh interior Border Gateway Protocol (iBGP) session formation.

4. The system of claim 1, wherein each of the plurality of router devices is configured to:
determine that automatic route reflector configuration is enabled and, in response, use its route reflector configuration database to elect, as a route reflector, the closest one of the plurality of router devices that is not currently elected as a route reflector.

5. The system of claim 1, wherein each router device elected as a route reflector is configured to:
determine a cluster identifier associated with that route reflector; and
provide that cluster identifier in the automatic route reflector peering communications it transmits to each of the other router devices.

6. The system of claim 1, wherein each router device elected as a route reflector is configured to:
determine that at least some of the router devices to which the automatic route reflector peering communications were transmitted have not accepted the role for that router device and, in response, end an interior Border Gateway Protocol (iBGP) session with that at least one router device.

7. An Information Handling System (IHS), comprising:
a processing system; and
a memory system that is coupled to the processing system and that includes instructions that, when executed by the processing system, cause the processing system to provide a route reflector configuration engine that is configured to:
exchange discovery communications with each of a plurality of router devices;
generate, using information included in the discovery communications, a route reflector configuration database;
operate, immediately subsequent to not being elected as a route reflector in response to an election by each of the plurality of router devices and based on respective route reflector configuration databases generated by each of the plurality of router devices, as a route reflector;
transmit, while operating as the route reflector, automatic route reflector peering communications to each of the plurality of router devices, wherein each automatic route reflector peering communication transmitted to a router device includes a role for that router device;
receive, while operating as the route reflector from at least some of the plurality of router devices to which the automatic route reflector peering communications were transmitted, an acceptance of the role for that router device; and
exchange, while operating as the route reflector, routes with each of the plurality of router devices that accepted the role for that router device that was transmitted in the automatic route reflector peering communications.

8. The IHS of claim 7, wherein the route reflector configuration engine is configured to:
discover, using the discovery communications received from each of the plurality of second router devices, one or more router devices to which it is directly connected, and one or more router devices that are directly connected to each router device to which it is directly connected.

9. The IHS of claim 7, wherein the route reflector configuration engine is configured, following the generation of the route reflector configuration database, to:
perform full mesh interior Border Gateway Protocol (iBGP) session formation.

10. The IHS of claim 7, wherein the route reflector configuration engine is configured to:
determine that automatic route reflector configuration is enabled and, in response, operate, immediately subsequent to not being elected as a route reflector in response to an election by each of the plurality of router devices and based on the respective route reflector configuration databases generated by each of the plurality of router devices, as a route reflector.

11. The IHS of claim 7, wherein the route reflector configuration engine is configured to:
determine a cluster identifier associated with the operation as a route reflector; and
provide that cluster identifier in the automatic route reflector peering communications transmitted to each of the plurality of router devices.

12. The IHS of claim 7, wherein the route reflector configuration engine is configured to:
determine that at least some of the router devices to which the automatic route reflector peering communications were transmitted have not accepted the role for that router device and, in response, end an interior Border Gateway Protocol (iBGP) session with that at least one router device.

13. The IHS of claim 7, wherein the route reflector configuration engine is configured to:
periodically flood the automatic route reflector peering communications to each of the plurality of router devices.

14. A method for automatically configuring route reflectors, comprising:
exchanging, by a first router device, discovery communications with each of a plurality of second router devices;
generating, by the first router device using information included in the discovery communications, a route reflector configuration database;
operating, by the first router device immediately subsequent to not being elected as a route reflector in response to an election by each of the plurality of second router devices and based on respective route reflector configuration databases generated by each of the plurality of second router devices, as a route reflector;

transmitting, by the first router device while operating as the route reflector; automatic route reflector peering communications to each of the plurality of second router devices, wherein each automatic route reflector peering communication transmitted to a second router device includes a role for that second router device;

receiving, by the first router device while operating as the route reflector from at least some of the plurality of second router devices to which the automatic route reflector peering communications were transmitted, an acceptance of the role for that second router device; and exchanging, by the first router device while operating as the route reflector, routes with each of the plurality of second router devices that accepted the role for that second router device that was transmitted in the automatic route reflector peering communications.

15. The method of claim 14, further comprising:

discovering, by the first router device using the discovery communications received from each of the plurality of second router devices, one or more second router devices to which it is directly connected, and one or more second router devices that are directly connected to each second router device to which it is directly connected.

16. The method of claim 14, further comprising:

performing, by the first router device following the generation of the route reflector configuration database, full mesh interior Border Gateway Protocol (iBGP) session formation.

17. The method of claim 14, further comprising:

determining, by the first router device, that automatic route reflector configuration is enabled and, in response, operating, immediately subsequent to not being elected as a route reflector in response to an election by each of the plurality of router devices and based on respective route reflector configuration databases generated by each of the plurality of router devices, as a route reflector.

18. The method of claim 14, further comprising:

determining, by the first router device, a cluster identifier associated with the operation as a route reflector; and providing, by the first router device, that cluster identifier in the automatic route reflector peering communications transmitted to each of the plurality of second router devices.

19. The method of claim 14, further comprising:

determining, by the first router device, that at least some of the second router devices to which the automatic route reflector peering communications were transmitted have not accepted the role for that second router device and, in response, end an interior Border Gateway Protocol (iBGP) session with that at least one second router device.

20. The method of claim 14, further comprising:

periodically flooding, by the first router device, the automatic route reflector peering communications to each of the plurality of second router devices.

* * * * *